United States Patent [19]
Lang

[11] Patent Number: 5,738,003
[45] Date of Patent: Apr. 14, 1998

[54] COUNTER CURRENT DIFFUSION EXTRACTOR

[75] Inventor: Timothy R. Lang, Pymble, Australia

[73] Assignee: Processing Technologies International Limited, New South Wales, Australia

[21] Appl. No.: 564,196

[22] PCT Filed: Jun. 7, 1994

[86] PCT No.: PCT/AU94/00301

§ 371 Date: Mar. 6, 1996

§ 102(e) Date: Mar. 6, 1996

[87] PCT Pub. No.: WO94/28735

PCT Pub. Date: Dec. 22, 1994

[30] Foreign Application Priority Data

Jun. 7, 1993 [AU] Australia .................... PL9199

[51] Int. Cl.$^6$ ................................................. A23N 1/00
[52] U.S. Cl. .................................... 99/513; 99/510; 100/112
[58] Field of Search ......................... 99/510, 513, 509, 99/495; 100/112, 125; 210/409, 411; 134/104.1, 115 R

[56] References Cited

U.S. PATENT DOCUMENTS

| | | |
|---|---|---|
| 2,587,556 | 2/1952 | Veiss et al. . |
| 2,629,663 | 11/1953 | Fogler et al. . |
| 2,793,582 | 5/1957 | Rothe et al. ............................ 99/495 |
| 3,529,938 | 9/1970 | Yoon et al. . |
| 3,726,209 | 4/1973 | Stoltze et al. . |
| 3,857,332 | 12/1974 | Houghton-Larsen et al. . |
| 4,289,579 | 9/1981 | Forsberg . |
| 4,363,264 | 12/1982 | Lang et al. ............................ 99/510 |
| 4,705,055 | 11/1987 | Rohm et al. ......................... 100/112 |

FOREIGN PATENT DOCUMENTS

| | | |
|---|---|---|
| 47936/85 | 4/1986 | Australia . |
| 47996/85 | 4/1986 | Australia . |
| A 23670/92 | 2/1993 | Australia . |
| A2337916 | 2/1975 | Germany . |
| 4118198 | 4/1992 | Japan .............................. 100/112 |
| A 914473 | 1/1963 | United Kingdom . |
| 2027356 | 2/1980 | United Kingdom .................. 100/112 |

Primary Examiner—Reginald L. Alexander
Attorney, Agent, or Firm—Nixon & Vanderhye

[57] ABSTRACT

A counter current extractor including an elongate housing with a screw conveyor therein and having a strainer at one end thereof to filter a liquid phase out of the counter current extractor, wherein the strainer is provided with a clearing member to prevent the strainer from remaining clogged with particulate material and wherein liquid being fed into the counter current extractor is spilled into the extractor so as to flow in a cascade over and through a solid phase in the extractor, the liquid being maintained at a desired level by a control member.

18 Claims, 2 Drawing Sheets

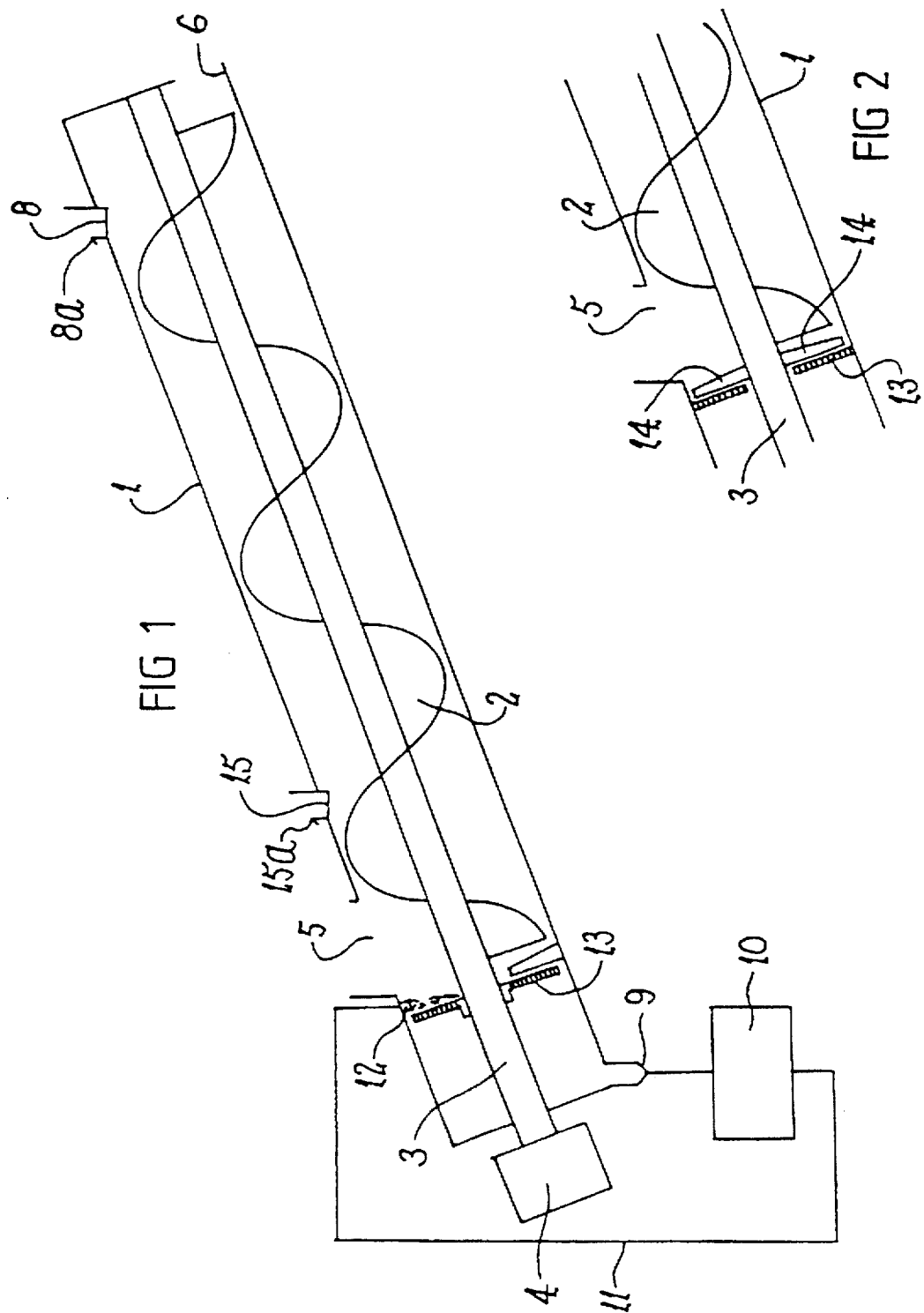

COUNTER CURRENT DIFFUSION EXTRACTOR

The present invention relates to an improved counter current extractor having improved flow characteristics.

BACKGROUND OF THE INVENTION

Counter current extractors (CCE's) are well known in the food processing industry for the continuous extraction of liquids, solubles, and fine particulate matter from associated solids. Such extractors may comprise a screw conveyor or pair of parallel counter rotating screw conveyors mounted within an inclined or vertical elongate housing, which takes the form of a trough or enclosed tube. Material to be processed is fed into the lower end of the housing and carried upward by screw rotation while an extracting liquid is fed into the top of the housing via spray jets and flows downwards under gravity. An example of this type of extractor is found in U.S. Pat. No. 4,363,264, which is incorporated herein by reference.

When the solid phase material reaches the top end of the housing, it is removed from the housing, either by a slat-type conveyor, or by being pushed up a ramp by the material being expelled behind it. The solid phase material may be pressed to remove liquid entrained therein, and this liquid is returned to an intermediate position of the CCE trough.

Generally, strainer means are provided to filter large particles of the solid phase from the extract liquid prior to its removal from the lower end of the housing. Problems have arisen in the past with particles of solid matter being trapped against the strainer means by the pressure of liquid flowing through the strainer means, thus blocking flow. This is particularly so where the material to be processed is added cold, so that increased quantities of hot recycle liquid are required to heat the material to improve extraction.

Another problem which arises from increased extracting liquid flow is the tendency of the solid phase to disintegrate under the higher spray pressure of the extracting liquid as it enters the CCE extractor. This contributes to the amount of small particulate matter within the extractor which causes blockage of the strainer means. In addition small particulate matter can create a blockage or reduce the porosity of the solids phase itself through the entire length of the CCE. This in turn reduces the flow rate of the liquid phase down the CCE in relation to the flow rate of the solid phase moving up the CCE, resulting in a high liquid retention level throughout the CCE causing the liquid to by-pass the solid phase resulting in higher dilution and lower yield.

Whilst it is desirable to ensure that the liquid phase passes freely through the retaining means, it is also desirable that a controlled amount of liquid be retained in the lower regions of the housing to enhance the solid/liquid contact in the vicinity of the solids charging point. In many, if not all applications, when solids are first added to the CCE, there is a net uptake of liquid into the solid phase, resulting in an increase in mass and volume of the solid phase. Whilst not wishing to be bound to any theory of operation, it is believed that where fruit, for example, enters the CCE with live, intact cell walls, osmotic pressure drives water into the cell, whilst the still organised cell wall ejects soluble compounds into the extracting liquid. After an initial uptake of water, lysing of the cell due to heat occurs, releasing the cytoplasm and added water. A similar effect is noted for dry material such as coffee beans, due to the hygroscopic nature of the material, rather than osmosis. No subsequent release of water occurs in this case.

The transfer Of liquid into and out of the solid phase is believed to have a significant effect on both concentration of the extract and the yield of soluble components transferred from the solid to the liquid phase. By controlling liquid level during the early processing of the solid phase, improved extraction can be achieved.

SUMMARY OF THE INVENTION

The present invention seeks to provide means for alleviating or overcoming one or more of these problems. Accordingly, there is provided a CCE having a strainer means at one end thereof to filter a liquid phase passing out of the CCE, wherein the strainer means is provided with clearing means to prevent the strainer means from remaining clogged with particulate material. The clearing means may include one or more liquid jets which eject liquid so as to clear the strainer means, or one or more wiping members which physically dislodge material from the strainer means. Both liquid jets and wiping members may be used in conjunction.

A further embodiment of the invention provides a CCE having liquid feed means so that a cascade of hot juice flows over the material to be processed as it is conveyed through the CCE housing by the screw.

In a preferred embodiment of the invention, there is provided a CCE including an elongate housing in the form of a trough or tube, and having a solid phase inlet at or adjacent a first end and a solid phase outlet at or adjacent a second end, a screw conveyor disposed within the housing and rotatable about its longitudinal axis to move solid phase material introduced into the housing from the said first end to the said second end, means for introducing an extracting liquid into the said second end of the housing and to cause it to flow along the housing to the said first end, drive means to cause the screw conveyor to rotate, strainer means to separate a liquid phase leaving the housing from the solid phase material entering the housing, and clearing means to keep the strainer means substantially clear of solid particles wherein the clearing means comprises one or more liquid jets, whereby liquid may be sprayed onto said strainer means which may be a wire screen at sufficient velocity to dislodge larger solids from the screen into the bulk of the solid phase material, whilst smaller solids are pushed through the screen into the outflow of the extracting liquid, while the strainer means is adapted to rotate so that different portions of the strainer means are presented to the clearing means, and wherein the level of the extracting liquid at the first end of the housing is maintained at a predetermined level by control means.

The liquid jets are preferably flat fan jets positioned such that the spray from the jets forms a lateral chord across the strainer means approximately one third of the way from the top of the strainer means. The jets are preferably angled at approximately 25°–45° from the plane of the strainer means, and are directed downwardly onto the screen. It is preferred that the liquid used is obtained from a balance tank used to store the extracting liquid which is discharged from the first end of the counter current extractor.

The wire screen is preferably unobstructed across its entire screening area and has apertures, the minimum dimensions of which range from about 2.5 millimeters to 10 millimeters, but are normally about 4 millimeters. It is preferred that the apertures are wider on the downstream side of the strainer means and this is achieved by using wedge wire to form a screen with a flat sided profile on the top-side or product solids side of the screen so that the smaller solids will clear easily through the wider profile on the bottom side or liquid side of the screen. The screen is made up of several segments so that the wedge wire forms a radial pattern out from the main screw shaft or axis. This has been designed in this pattern so that as the screen rotates, the liquid jets strike the flat profile of the screen at an angle of approximately 35°, causing the solids, that are pressed against the flat surface, to peel off the screen in a continuous roll back into the main body of solids in the CCE. As the screen rotates further the wedge wire presents longitudinally or vertically in relation to the liquid jets so that the high velocity liquid spray will pass through the screen taking the smaller solid particles along with it, leaving the screen clear and ready to be re-submerged into the liquid and solids in the lower segment of the CCE.

In a further preferred embodiment, a driving shaft for the screw conveyor projects through the wire screen. Clearing means are attached to the driving shaft so as to rotate therewith, said clearing means being at least one wiper member in close juxtaposition with the wire screen so as to clear solid phase material from the wire screen. The wiper member may comprise one or more blades extending radially from the driving shaft sufficiently close to the wire screen to dislodge solid phase material therefrom.

The clearing means may comprise a liquid jet and a wiper member in conjunction.

It will be appreciated that rather than having a fixed wire screen with rotating clearing means, the wire screen may be fixed to the driving shaft to rotate therewith, whilst the clearing means remains stationary to achieve the same effect.

In another embodiment of the invention, the liquid feed means for introducing liquid into the housing comprises a reservoir having a weir arranged laterally across said elongate housing such that extraction liquid introduced into the reservoir spills over the weir and flows in a cascade over and through the solid phase material as said material is conveyed by the screw conveyor from the first end toward the second end of the counter current extractor. This avoids the spray of extracting liquid onto the solid phase of prior art methods and thereby reduces breakup of the solid phase.

Means are preferably provided for recycling extracting liquid from the first end of the housing, heating it to some desired temperature and returning it via liquid feed means to the housing at a point between the first end and the second end of the housing. A suitable proportion of the extracting liquid discharged from the lower end of the housing is desirably diverted through an independent heat exchanger where it is heated and recirculated to the housing at some point above the said first end. As the objective is to achieve rapid heating of material at an early stage of processing, the heated, recirculated extraction liquid should be introduced into the lower half of the housing, preferably at a point from about one twentieth to about one quarter the length of the housing from the said first end.

Suitable liquid level control means may comprise an adjustable height outlet within the counter current extractor trough, requiring liquid to reach the height of the outlet before exiting the trough. Similar control means may comprise an adjustable height inlet into a balance reservoir tank in which liquid is kept for recirculation purposes. This allows the outlet from the counter current extractor trough to be flush with the bottom of the trough, aiding in cleaning of the trough. Because the inlet to the balance tank is adjusted to be higher than the bottom of the counter current extractor trough, liquid pools in the trough until reaching the level of the inlet to the balance tank. A further method for controlling the liquid level is by use of a level sensing control system. The required liquid level is programmed into a programmed logic control (PLC) unit. The PLC unit monitors the liquid level using, for example, an ultrasonic sensor and opens or closes a motorised liquid outlet valve so as to maintain a constant level.

The housing of the extractor is preferably provided with a jacket through which a fluid may be passed. In this way the temperature of the housing and to some degree the temperature of the contents thereof may be controlled.

The extracting liquid will frequently be water; however, other liquids including organic liquids or aqueous or organic solutions could be used. The process may be used for the extraction of soluble or dispersible material from fruit or vegetable matter such as sugarbeet, sweet sorgum, grapes, grape marc or grape pomace, tea, citrus fruit, citrus peel, apples, pears, coffee beans, vanilla beans, and from animal matter such as fish heads and offal. Residue material such as apple peels and cores, citrus peel and grape marc or grape pomace may also be exhaustively extracted to recover valuable soluble components which are normally discarded with these residues. Soluble sugars recovered from apple or pear peels and cores could be used in the preparation of canning syrups or fermented to alcohol. Other residues contain material such as flavouring, colours or specific useful materials such as pectins which may be recovered. For satisfactory extraction, it is preferred that the materials are in a particulate form, the shape of the particles being such that the diffusion path for the migration of the soluble material out of the particles is short in at least one direction.

Tests show that the improvements of the invention result in a marked increase in extract concentration. Before introduction of clearing means for the strainer means, liquid extract was either more diluted than expected, or recovered in smaller quantities, or both. Clearing of blocked strainer means required about 20 minutes downtime, with a corresponding drop in production capacity for a given CCE.

Introduction of liquid jets to clear the strainer means of a CCE used to extract solubles from citrus peel resulted in concentration of solubles in extract liquid streams increasing from 3.5° to 4.5° Brix. Yield increased from 20 kg soluble solids per tonne of peel to 22 kg soluble solids per tonne of peel, and the capacity of the counter current extractor increased from 4.5 tonnes per hour to 5.0 tonnes per hour.

Further improvement may be obtained by using a weir distribution system for recycle and extracting liquids. Soluble material concentrations obtained using this further improvement are above 4.5° Brix, usually about 6.5° Brix and even as high as 8.0° Brix.

BRIEF DESCRIPTION OF THE DRAWINGS

Hereinafter given by way of example only is a preferred embodiment of the invention described with reference to the accompanying drawings, in which:

FIG. 1 is a semi-schematic diagram of a counter current extractor according to the present invention.

FIG. 2 is a semi-schematic diagram of part of a counter current extractor according to a further embodiment of the invention.

DETAILED DESCRIPTION OF PREFERRED EMBODIMENTS

Figure 3:
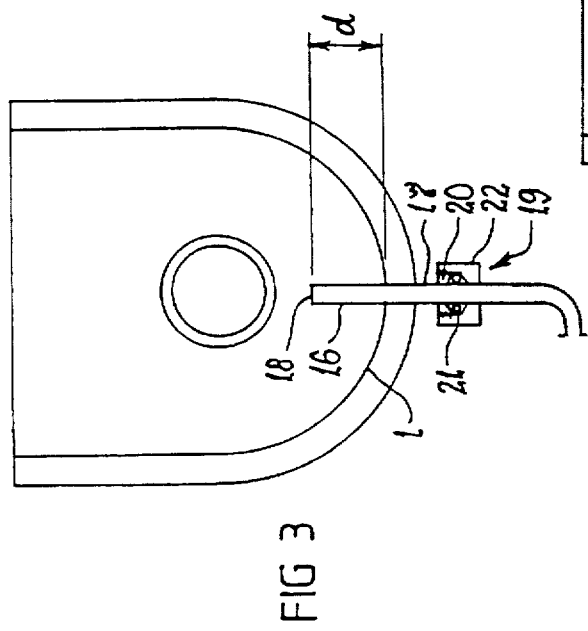
FIG. 3 is a cross-section of a counter-current extractor trough showing one embodiment of the level control means.

As seen in FIG. 1, the counter current extractor comprises a elongate housing 1 in which is disposed a screw conveyor comprising a driving shaft 3 having a helical flight 2 disposed about it and a drive means 4 to rotate the driving shaft 3 about its longitudinal axis. The elongate housing has a solid phase inlet 5 and solid phase outlet 6. Solid material to be extracted is supplied to the elongate housing through inlet 5 and conveyed by the helical flight 2 to the outlet 6. Extracting liquid is supplied to the lateral channel 8 from which it flows over weir 8a and then through the elongate housing to liquid phase outlet 9. The liquid phase must pass through screen 13 before reaching outlet 9, screen 13 having small aperatures therein to separate solid phase material from the extracting liquid. A portion of the extracting liquid flows from outlet 9 to balance tank 10 from whence it is pumped via line 11 to liquid jets 12 which direct the liquid laterally onto screen 13 at sufficient velocity to dislodge solid phase particles therefrom. Further heated extracting liquid may also be provided to the elongate trough 1 by means of a further lateral channel 15 and weir 15a, to heat the solid phase upon entry into the trough 1 to improve extraction.

FIG. 2 shows an alternative embodiment of the invention wherein screen 13 is cleared of solid phase particles by means of blades 14 which are attached to driving shaft 3 so as to rotate therewith. As blade 14 is immediately adjacent screen 13, the movement of blade 14 past screen 13 dislodges solid phase particles from screen 13.

It is also envisaged that embodiments of the invention having a rotating screen may have both liquid jets 12 and a blade 14 together.

In FIG. 3, a liquid control means is illustrated, comprising an inner tube 16 slidably mounted in an outer tube 17. The end 18 of tube 17 may be adjusted so that depth of the liquid, corresponding to distance d between the bottom of trough 1 and end 18 may be varied. Tube 16 is held in place by compression sealing means 19, comprising a threaded flange 20 at the end of tube 17, a compressible member 21 and a collar member 22 adapted to be screwed onto the threaded flange 20, thereby compressing compressible member 21 to seal the end of outer tube 17 and retain inner tube 16 in position.

Figure 4:
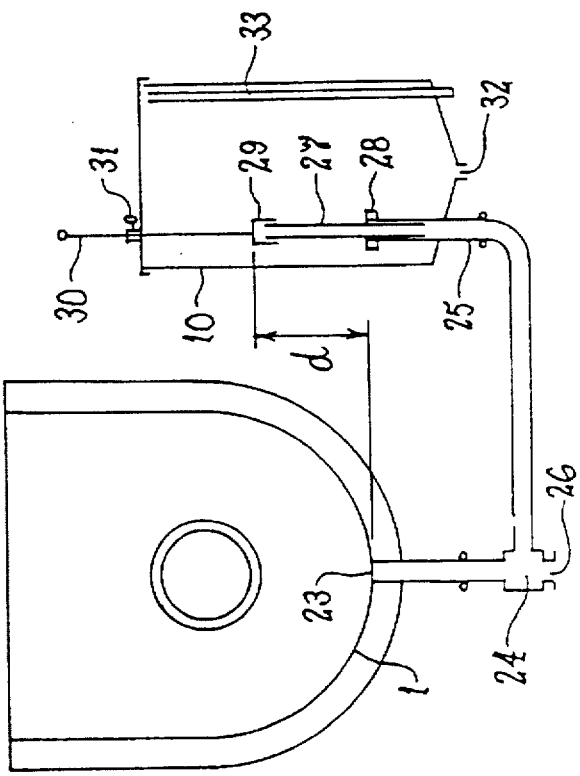
FIG. 4 is a cross-section of a counter-current extractor trough and associated balance juice tank showing a further embodiment of the liquid control means.

FIG. 4 shows an alternative liquid level control means which has a flush mounted liquid exit 23, allowing a liquid level of zero or greater possible and making cleaning of the trough 1 easier. Liquid exits the trough 1 via exit 23 and passes through valve means 24 to the outer tube 25. Valve means 24 may also be set to allow liquid to pass into a washout drain 26 during cleaning. The outer tube 25 has an inner tube 27 slidably mounted therein, tubes 25 and 27 being provided with sealing means 28 to prevent leakage between the tubes. The height of end 29 of tube 27 may be adjusted by adjustment means 30, which is held in position by locking screw 31. Because the end 29 is above the liquid exit 23, the depth of the liquid d in trough 1 is controlled by adjusting the height of end 29. Liquid flows from end 29 into balance tank 10, from which it is removed via pump outlet 32. An overflow tube 33 is provided to control overfilling of balance tank 10. In some embodiments, several pump outlets may be provided for the juice, eg. a finished juice outlet, a recycle juice outlet and a screen spray outlet.

Figure 5:
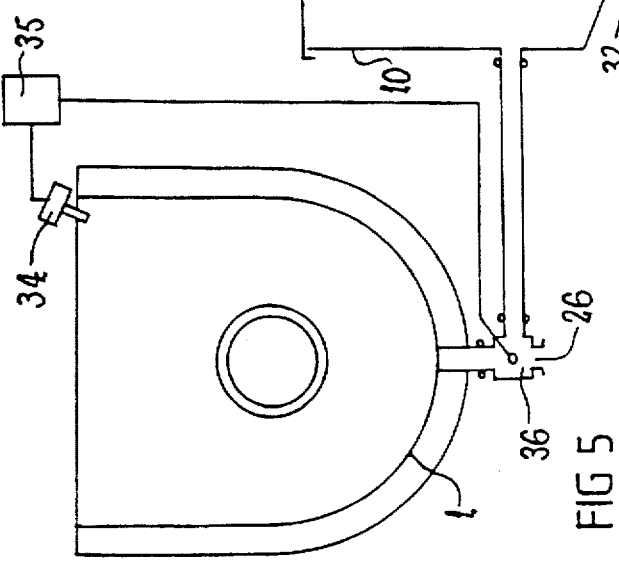
FIG. 5 is a diagramatic cross-section of a CCE and associated balance juice tank showing a further embodiment of the liquid control means.

FIG. 5 shows an ultrasonic level sensor 34 mounted above trough 1. Level sensor 34 is attached to a programmed logic control (PLC) unit 35, into which the desired liquid level has been programmed. In response to information provided by the level sensor 34, the PLC unit 35 opens or closes a motorized valve 36, allowing liquid to flow into balance tank 10.

I claim:

1. A counter current extractor comprising:
   an elongate housing;
   a screw conveyor provided in said housing;
   strainer means at one end of said housing for filtering a liquid phase passing out of the counter current extractor;
   clearing means associated with said strainer means for preventing said strainer means from remaining clogged with particulate material, said clearing means including at least one liquid jet which ejects liquid so as to dislodge particulate material from said strainer means, said strainer means comprising a wire screen having an upstream side and a downstream side and having apertures therein, said wire screen being formed of wedge wire so that a substantially flat profile is created on said upstream side of said screen and the apertures in said screen are wider on the downstream side of the screen than the upstream side of the screen.

2. A counter current extractor according to claim 1, wherein the clearing means includes at least one liquid jet which ejects liquid so as to dislodge particulate material from the strainer means and at least one wiping member which physically dislodges particulate material from the strainer means.

3. A counter current extractor according to claim 1, wherein the strainer means comprises a circular wire screen having apertures therein, said apertures having a minimum dimension which ranges from approximately 2.5 mm to 10 mm.

4. A counter current extractor according to claim 3, wherein the liquid jet is a flat fan jet arranged so that the spray from the jet strikes the strainer means substantially downwardly at an angle of between approximately 25° to 45° from the plane of the strainer means, so as to define a chord across the circular strainer means.

5. A counter current extractor according to claim 4, wherein the spray from the jets strike the strainer means at approximately 35° from the plane of the strainer means so as to define a substantially horizontal chord approximately ⅓ of the way from the top of the strainer means.

6. A counter current extractor according to claim 3, wherein the circular wire screen is adapted to rotate about its axis so as to present different portions of the screen to the liquid jet.

7. A counter current extractor according to claim 6, wherein the circular wire screen is attached to a driving shaft of the screw conveyor so as to rotate therewith.

8. A counter current extractor according to claim 2, wherein the strainer means comprises a circular wire screen having apertures therein, the minimum dimension of which ranges from approximately 2.5 mm to 10 mm and wherein the wire screen is formed of wedge wire so that a substantially flat profile is created on the upstream side of the screen and the apertures are wider on the downstream side of the screen than the upstream side of the screen.

9. A counter current extractor according to claims 8, wherein the wiping member is a stationary blade abutting the upstream side of the wire screen and wherein the wire screen is adapted to rotate about its axis so that as different portions of the wire screen move past the stationary blade, particulate matter is dislodged from the screen by the blade.

10. A counter current extractor according to claim 9, wherein the circular wire screen is attached to a driving shaft of the screw conveyor so as to rotate therewith.

11. A counter current extractor according to claim 8, wherein the wiping member is a rotating blade abutting the upstream side of a stationary wire screen so that as the blade moves past different portions of the wire screen, particulate matter is dislodged from the screen by the blade.

12. A counter current extractor according to claim 11, wherein the rotating blade is attached to a driving shaft of the screw conveyor so as to rotate therewith.

13. A counter current extractor comprising an elongate housing with a screw conveyor therein and having liquid feed means comprising a reservoir having a weir disposed laterally across said elongate housing such that a liquid introduced into the reservoir spills over the weir and flows in a substantially continuous cascade over and through a solid phase in the counter current extractor.

14. A counter current extractor according to claim 13, including control means to maintain the level of the liquid phase in the elongate housing at a desired level, wherein said control means comprises a height adjustable outlet from the elongate housing whereby the liquid level must reach a certain depth in the elongate housing before it can flow through the outlet.

15. A counter current extractor according to claim 13, including control means to maintain the level of the liquid phase in the elongate housing at a desired level, wherein the control means comprises an adjustable height inlet into a storage tank, connected to a liquid outlet at the lowest portion of the elongate housing by connecting means, whereby the liquid level in the elongate housing and the connecting means must reach a certain depth before it can flow from the liquid inlet into the storage tank.

16. A counter current extractor according to claim 13, including control means to maintain the level of the liquid phase in the elongate housing at a desired level, wherein the control means comprises a level sensing means, a programmed logic control (PLC) unit and a motorized liquid outlet valve, whereby the PLC unit opens the liquid outlet valve when the level sensing means senses that the liquid level has reached a predetermined maximum level and closes the liquid outlet means when the level sensing means senses that the liquid level is below a predetermined minimum level.

17. A counter current extractor according to claim 16, wherein the level sensing means comprises an ultrasonic proximity sensor arranged above the surface of the liquid in the elongate housing.

18. A counter current extractor comprising:
    an elongate housing having a solid phase inlet at a first end portion and a solid phase outlet at a second end portion;
    a screw conveyor disposed within said housing and rotatable about its longitudinal axis to move solid phase material introduced into said housing from said first end portion to said second end portion;
    means for spilling extracting liquid into the said second end portion of the housing so that extracting liquid flows in a cascade over and through the solid phase material to the said first end portion;
    drive means for causing the screw conveyor to rotate;
    strainer means for separating liquid phase leaving the housing from solid phase material entering the housing, said strainer means comprising a wire screen having an upstream side and a downstream side, and having apertures therein, the wire screen being formed of wedge wire so that a substantially flat profile is created on the upstream side of the screen and the apertures in the screen are wider on the downstream side of the screen than the upstream side of the screen; and
    clearing means for keeping the strainer means substantially clear of solid particles, said clearing means comprising at least one liquid jet for spraying liquid onto said strainer means at sufficient velocity to dislodge larger solids from the screen into the bulk of the solid phase material, whilst smaller solids are pushed through the strainer means into the outflow of the extracting liquid, said strainer means being rotatable so that different portions of said strainer means are presented to said clearing means; and
    control means for maintaining extracting liquid at the first end portion of the housing at a predetermined level.

* * * * *